United States Patent [19]

Ho et al.

[11] 4,205,300

[45] May 27, 1980

[54] VEHICLE ANTITHEFT ALARM

[75] Inventors: Eugene Y. Ho, San Carlos; Joseph A. Musolino, San Jose, both of Calif.

[73] Assignee: Techne Electronics, Ltd., Redwood City, Calif.

[21] Appl. No.: 718,587

[22] Filed: Aug. 30, 1976

[51] Int. Cl.² .................. B60R 25/10; B60R 25/04; G08B 13/08

[52] U.S. Cl. .................. 340/65; 180/287; 200/61.47; 200/61.52; 307/10 AT; 340/64; 340/528; 340/543; 340/545

[58] Field of Search .................. 340/63, 64, 65, 52 H, 340/274 R, 274 C, 276, 261; 200/61.47, 61.52; 307/10 AT; 180/104, 114

[56] References Cited

U.S. PATENT DOCUMENTS

| | | | |
|---|---|---|---|
| 2,782,276 | 2/1957 | Woods | 200/61.47 |
| 3,074,049 | 1/1963 | Saliba et al. | 340/65 |
| 3,513,466 | 5/1970 | Isaacs et al. | 340/63 |
| 3,790,933 | 2/1974 | Cort | 340/63 |
| 3,921,128 | 11/1975 | Snead | 340/52 H |
| 3,950,678 | 4/1976 | Brewer | 340/274 C |
| 4,021,796 | 5/1977 | Fawcett et al. | 340/274 C |

Primary Examiner—John W. Caldwell, Sr.
Assistant Examiner—James J. Groody
Attorney, Agent, or Firm—Jack M. Wiseman

[57] ABSTRACT

An antitheft system for vehicles in which an operator actuates a thumbwheel to select one predetermined numerical combination and actuates a push button switch to turn on the system. The operator also actuates the thumbwheel to select another predetermined numerical combination and actuates the push button switch to turn off the system. The actuation of the thumbwheel by an operator to a numerical combination other than one of the predetermined numerical combination results in the operation of an alarm. Disposed within the vehicle are mercury switches, which sense any movement of the vehicle, when the system is turned on. When a mercury switch senses any movement of the vehicle, such as movement caused by the towing of the vehicle or the jacking up of the vehicle, the change of state of the mercury switch initiates the operation of an alarm. Also, the opening of a hood, door or trunk will initiate the operation of an alarm when the system is turned on. The operation of an alarm will also result in the cutoff of power for the ignition system.

8 Claims, 6 Drawing Figures

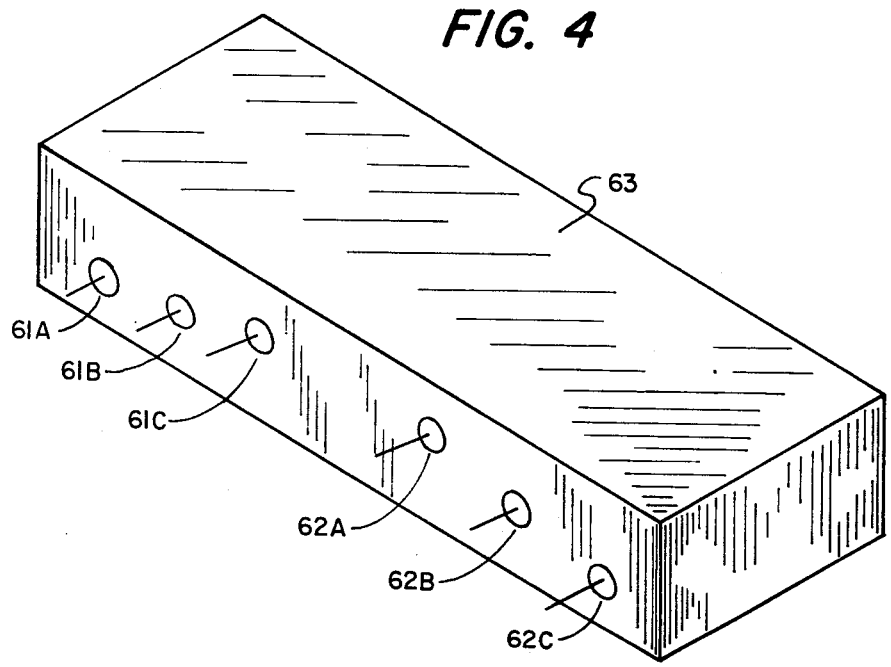
FIG. 4
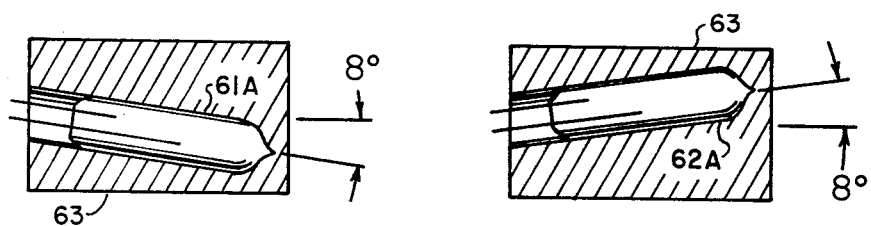
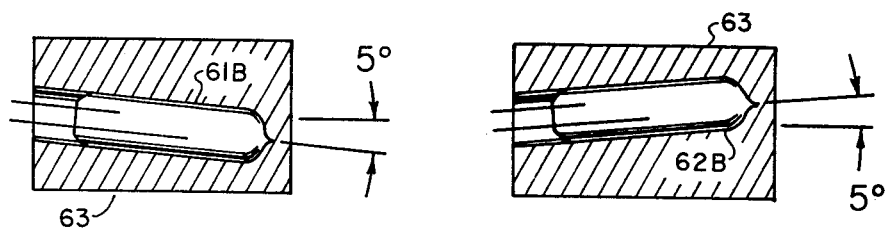
FIG. 5
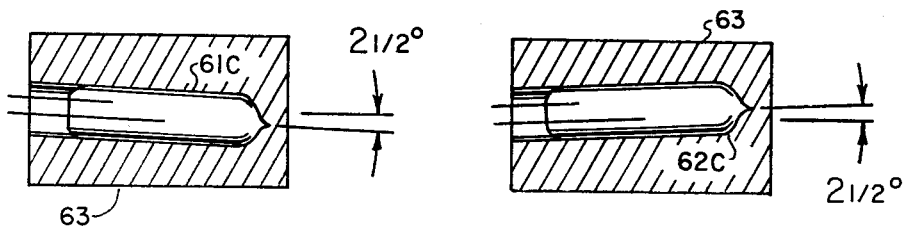

VEHICLE ANTITHEFT ALARM

BACKGROUND OF THE INVENTION

The present invention relates in general to theft alarm systems, and more particularly to a theft alarm system for a vehicle.

Heretofore, theft alarm systems for vehicles did not sense motion of a vehicle on different degrees of incline. Hence, unauthorized persons could remove parts, such as tires and wheels, without detection or apprehension. Door and ignition locks are not adequate protection. Even a conventional alarm with a key activator mounted on the exterior of the car has not been totally satisfactory. Such arrangement did not provide detection against unauthorized persons removing wheels, opening hoods, opening trunks or the like.

SUMMARY OF THE INVENTION

An object of the present invention is to provide a theft alarm system for vehicles which senses movement of the vehicle, such as towing or jacking up, for initiating the operation of an alarm.

Another object of the present invention is to provide a theft alarm system in which an operator selects a predetermined numerical combination to turn on the system, and in which an operator selects another predetermined numerical combination to turn off the system. In the event a numerical combination is selected other than one of the predetermined numerical combinations, the operation of an alarm is initiated, or the ignition system is temporarily disabled, or both.

Another object of the present invention is to provide a theft alarm system for vehicles in which unauthorized opening of a trunk, hood or door initiates the operation of an alarm.

A feature of the present invention is that the operation of an alarm is accompanied by the temporary disablement of the ignition system of the vehicle.

Another feature of the present invention is the predetermined time delay between the opening of a door and the operation of an alarm to enable an authorized person entering the vehicle to deactivate the alarm.

Another feature of the present invention is the predetermined time delay between the initial activating of an alarm and the operation of an alarm to enable an authorized person to turn on the system and to leave the vehicle without operating an alarm.

Another feature of the present invention is the operation of an alarm by either the unauthorized opening of the hood or the unauthorized opening of the trunk.

Another feature of the present invention is that the vehicle can be parked on a level surface or parked on an inclining or declining surface and a change in motion of the vehicle thereafter will cause an alarm to be operated or the ignition system disabled or both.

Another feature of the present invention is that its current operating requirements are relatively low, so that a vehicle may be stored under alarm-operating conditions for an extended period of time.

DESCRIPTION OF THE DRAWINGS

FIG. 4 is a perspective view of the mounting block and banks of mercury switches mounted thereon incorporated in the apparatus shown in FIG. 1.

FIG. 5 is a diagrammatic illustration of the mounting of the banks of mercury switches employed in the apparatus shown in FIG. 1.

Figure 1:
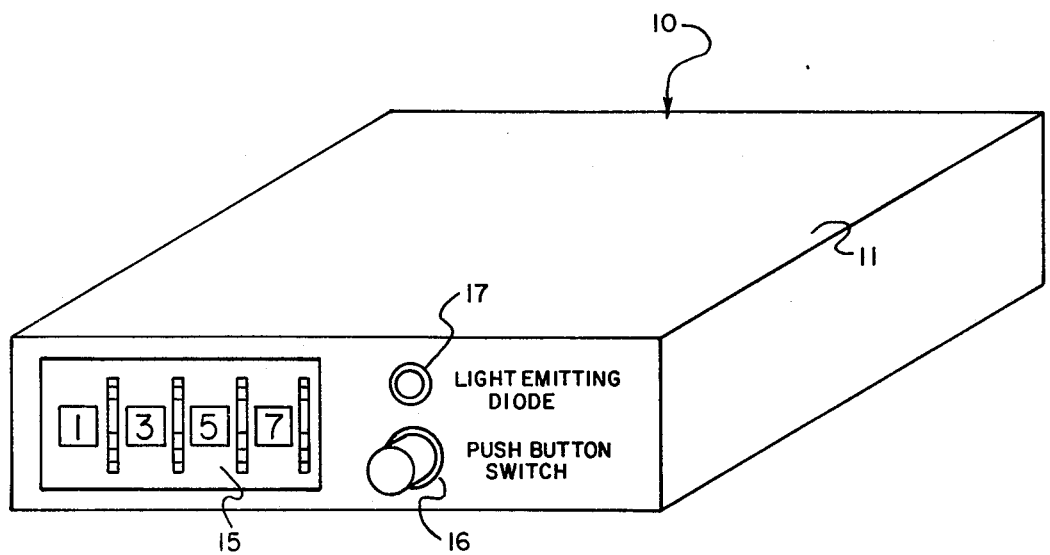
FIG. 1 is a front perspective of the antitheft apparatus for vehicles embodying the present invention.

Illustrated in FIG. 1 is the antitheft apparatus 10 for vehicles embodying the present invention which comprises a housing 11. Mounted on the housing 11 to be viewed by an operator are a code selector switch 15 in the form of a conventional four-digit thumbwheel switch, a conventional push button switch 16, and a suitable warning signal in the form of a well-known light emitting diode 17. Mounted in the housing 11 are the electrical circuits (FIGS. 2, 3A and 3B) employed in the apparatus 10.

To turn the apparatus "on", an operator actuates the thumbwheel switch 15 (FIGS. 2 and 3B) manually to select a predetermined four-digit code. Thereupon, the thumbwheel switch 15 prepares an "on" circuit for conventional on-off flip-flop circuit 20 (FIGS. 2 and 3B) shown schematically by an "on" switch 15a (FIG. 3B). Thereupon, the operator actuates the push button switch 16 to place a ground on the "on" circuit for activating the on-off flip-flop circuit 20.

Figure 2:
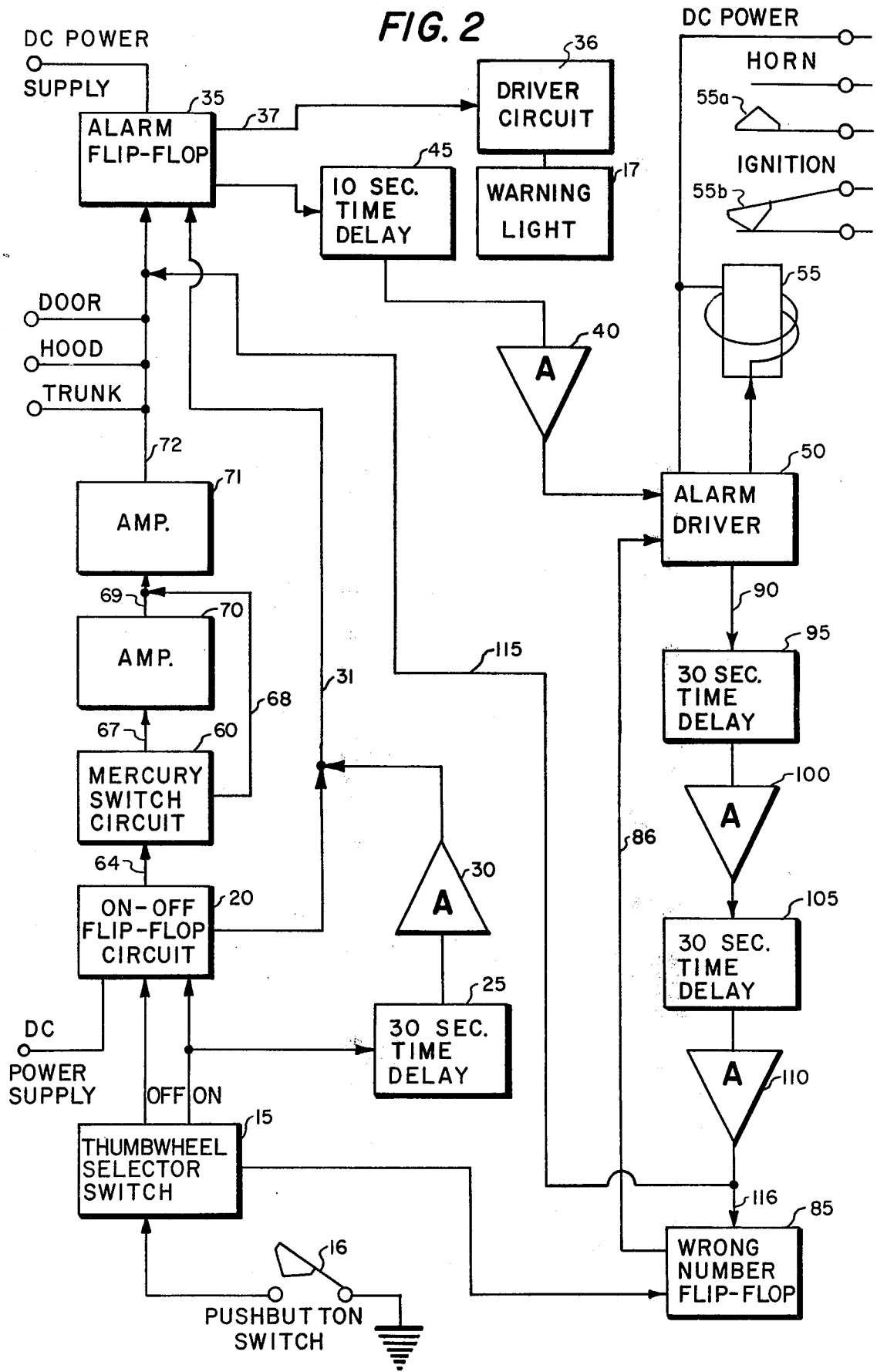
FIG. 2 is a block diagram of the electrical circuits incorporated in the apparatus shown in FIG. 1.
Figure 3A:
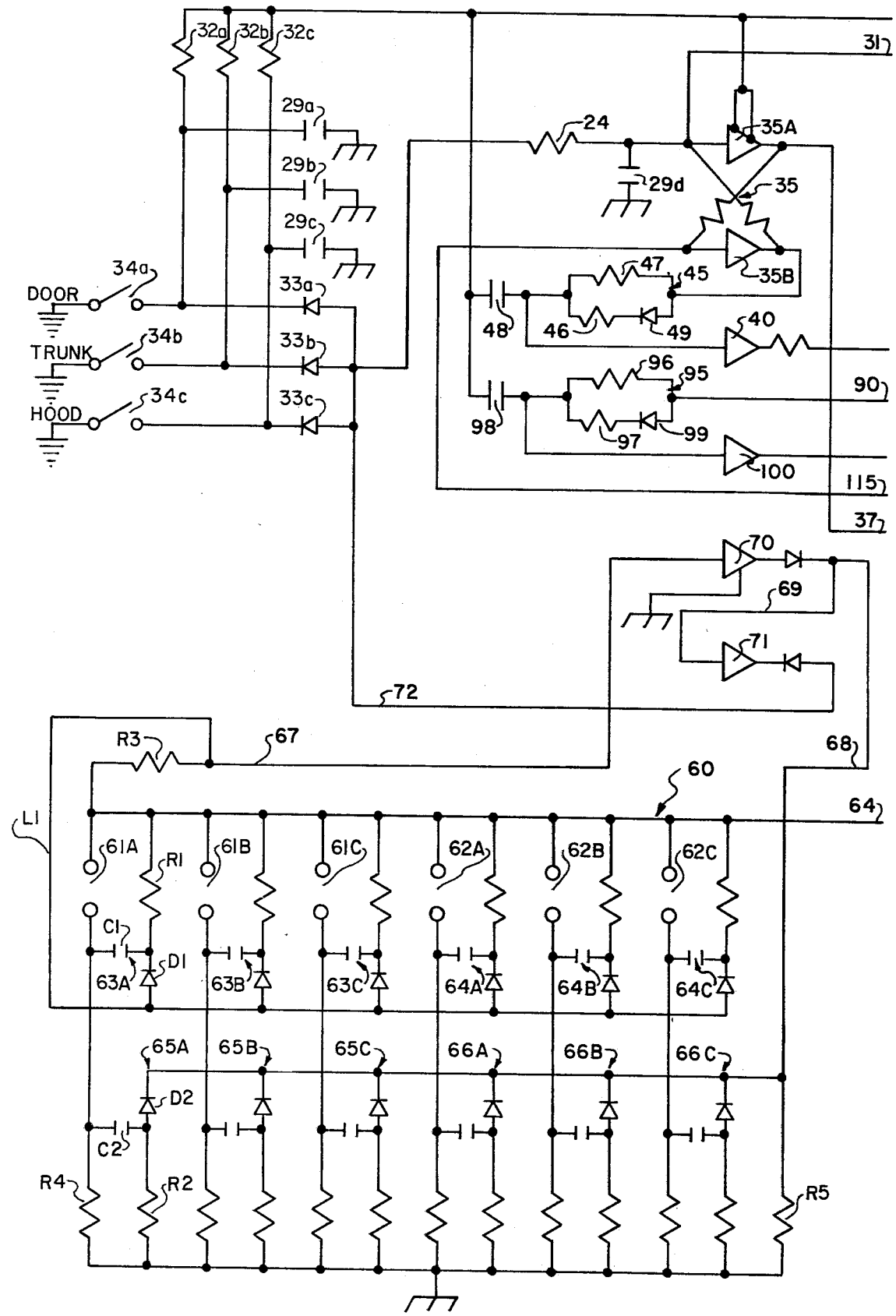
FIGS. 3A and 3B, when placed side-by-side, are a schematic diagram of the electrical circuits employed in the apparatus shown in FIG. 1.
Figure 3B:
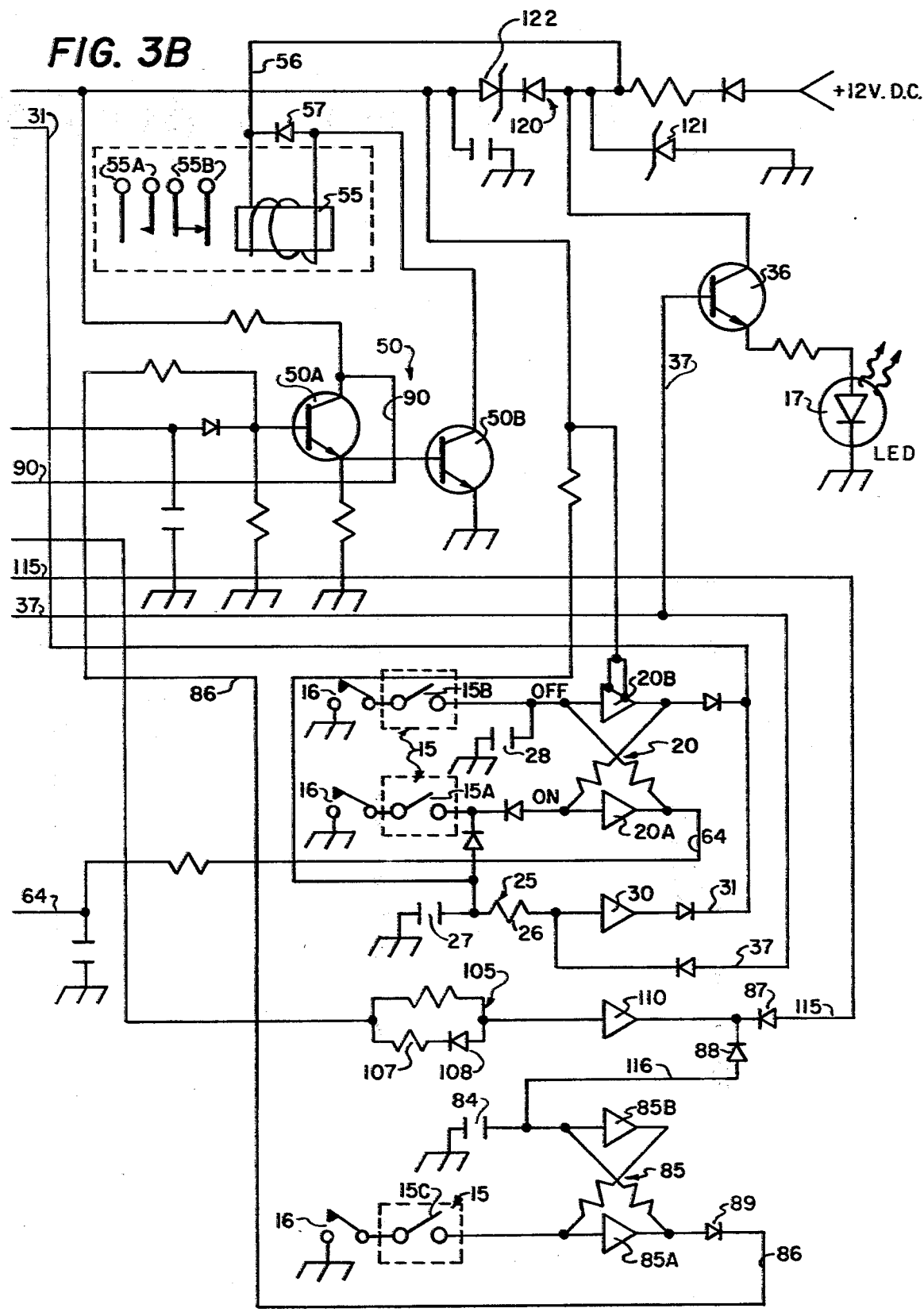

The on-off flip-flop circuit 20 includes a pair of amplifiers 20a and 20b connected in a bi-stable configuration (FIGS. 2 and 3B). When the "on" circuit is completed to activate the on-off flip-flip circuit 20, the amplifier 20a changes its state to change the state of the amplifier 20b to remove a positive potential output from the amplifier 20b.

Connected to the "on" circuit is a conventional RC time delay circuit 25 comprising a resistor 26 and a capacitor 27. Connected to the RC time delay circuit 25 is an amplifier 30. The time delay circuit 25, in the exemplary embodiment, provides a thirty-second delay. When the "on" circuit is completed, the amplifier 20b of the on-off flip-flop circuit 20 has changed its state to remove the positive potential in the output thereof. After a thirty-second time delay, through the RC time delay circuit 25, a positive signal is applied to the amplifier 30, which in turn removes the positive potential over a conductor 31. A noise suppression capacitor 28 connected to ground is included in the on-off flip-flop circuit 20.

The conductor 31 is connected to the input side of an alarm flip-flop circuit 36 (FIGS. 2 and 3A) to prepare the alarm flip-flop circuit 35 for operation or to place it in an intrusion detection state. The thirty-second time delay above-described enables the operator, after preparing the apparatus 10 for operation or placing it in an intrusion detection state, to leave the vehicle before an open door initiates the operation of an alarm through the alarm flip-flop circuit 35 in a manner to be described hereinafter.

Mounted on each door, hood, and trunk are respective switches, shown schematically as 34a, 34b and 34c (FIG. 3A), which close respectively when the associated door, hood or trunk is opened. The closing of any one of such switches places a ground on the associated conductor. Such switches are opened, respectively, when the associated door, hood or trunk is closed. Connected to the switches 34a, 34b and 34c are OR gates 33a, 33b and 33c, respectively. Also connected to the switches 34a, 34b and 34c are resistors 32a, 32b and 32c, which supply a positive potential to the OR gates 33a, 33b and 33c, respectively. Capacitors 29a, 29b, 29c and 29d serve to reduce noise interference. A resistor 24 is a current-limiting resistor during the "off" period and when the switches 34a, 34b and 34c are closed. The alarm flip-flop 35 comprises a pair of amplifiers 35a and 35b (FIG. 3A) connected in a bi-stable configuration.

When a door, hood or trunk is opened, while the apparatus 10 is "on", a negative going potential signal is applied to the input side of the amplifier 35a of the alarm flip-flop circuit 35. This action causes a positive signal to be applied to the input side of an amplifier or driver circuit 36 (FIG. 3B) over a conductor 37 to energize a suitable warning light, such as the light-emitting diode 17. The warning light 17 serves to warn an authorized operator that the alarm has been triggered and he has 10 seconds in which to turn off the apparatus 10 in a manner to be described hereinafter.

The change of state of the amplifier 35a of the flip-flop circuit 35 causes the amplifier 35b to change its state. The change of state of the amplifier 35b causes a negative potential to be applied to the input side of an amplifier 40 through a time delay network 45 comprising resistors 46 and 47 and capacitor 48. A diode 49 speeds up the reset time when the turnoff signal is initiated. In the exemplary embodiment, the time delay produced by the time delay network 45 is ten seconds. Connected to the output of the amplifier 40 is a suitable alarm drive circuit 50 (FIGS. 2 and 3B), which includes serially connected current amplifiers 50a and 50b. In series with the output of the current amplifier 50b is a suitable relay 55 (FIGS. 2 and 3B) which is energized by a suitable D.C. power supply over a conductor 56.

When a positive potential is applied to the input side of the current amplifier 50a from the output of the amplifier 40, the relay 55 is energized over a path including the D.C. power supply, the current amplifier 50b and ground. The energization of the relay 55 closes the contacts 55a to operate a horn, not shown, and the contacts 55b open to cut off the power to the ignition system, not shown, for disabling the ignition system. A diode 57 protects the alarm driver 50 from back electromotive force during an "off" condition. Thus, there is a ten-second time delay between the opening of a door and the operating of an alarm. Therefore, an authorized operator entering the vehicle has ten seconds in which to turn off the apparatus 10 in a manner to be described hereinafter.

According to the present invention, the apparatus 10 senses the movement or motion of the vehicle, when the apparatus is turned on, for operating the alarm and temporarily disabling the ignition system. Toward this end, a mercury switch circuit 60 is provided. In the preferred embodiment, the mercury switch circuit 60 (FIGS. 2, 3A, 4 and 5) includes two sets of mercury switches 61a–61c and 62a–62c. In each set there are three mercury switches. The mercury switches, in the exemplary embodiment, can be either normally opened or normally closed. Whether any switch is normally opened or normally closed will depend on the surface on which the vehicle is resting. More specifically, it will depend on whether the vehicle is resting on a horizontal surface, an inclining surface or a declining surface. Therefore, certain mercury switches will be open and certain mercury switches will be closed, depending on the terrain or surface on which the vehicle rests. The mercury switches are mounted in a suitable insulator block 63 (FIG. 4), such as Teflon, within the housing 11. One mercury switch 61c and 62c (FIG. 5) of each set is disposed, in the exemplary embodiment, at an angle of $2\frac{1}{2}°$ from the horizontal. The succeeding switches 61b and 62b of each set are disposed, in the exemplary embodiment, at an angle of 5° from the horizontal. Lastly, the succeeding switches 61a and 62a are disposed at an angle of 8°, in the exemplary embodiment, from the horizontal. Thus, the sudden movement or tilting of the vehicle will change the state of one or more of the mercury switches 61a–61c and 62a–62c. More specifically, depending on the motion of the vehicle, certain of the normally closed mercury switches will open and certain of the normally opened mercury switches will close. In this manner, the mercury switch circuit 60 senses unauthorized movement of the vehicle, when the apparatus 10 is turned "on".

When the apparatus 10 is turned "on" in the manner above-described, the output of the amplifier 20a of the on-off flip-flop circuit 20 applies a positive potential over a conductor 64 for application to the mercury switch circuit 60. Connected to the output of the mercury switch circuit 60 are serially connected A.C. sensing amplifiers 70 and 71 (FIGS. 2 and 3A).

When the vehicle remains in its initial state, neither the A.C. sensing amplifier 70 nor the A.C. sensing amplifier 71 will produce an output signal to trigger the alarm flip-flop circuit 35, since there is no A.C. signal applied to the respective input circuits thereof. Associated with each mercury switch 61a–61c and 62a–62c is a negative going signal forming network 63a–63c and 64a–64c connected in parallel relation therewith. When a mercury switch 61a–61c and 62a–62c changes its state from a normally closed position to an open position in response to sensing motion, its associated negative going signal network 63a–63c and 64a–64c will produce a negative going signal over a conductor 67.

Each negative going signal forming network 63a–63c and 64a–64c includes a capacitor, a resistor and a rectifier. For example, the negative forming signal network 63A includes a capacitor $C_1$, a resistor $R_1$, and a rectifier $D_1$. When the mercury switch 61a is opened, the capacitor $C_1$ changes over a path including the resistor $R_1$ and resistor $R_4$. When the mercury switch 61a is closed, the capacitor $C_1$ discharges through resistor $R_1$. When the mercury switch 61a is opened in response to the motion of the vehicle, a negative going signal is applied to the conductor 67 over the following path from the charging of the capacitor $C_1$: capacitor $C_1$, resistor $R_1$, and resistor $R_4$.

Associated with each mercury switch 61a–61c and 62a–62c is a positive going signal forming network 65a–65c and 66a–66c connected in series relation therewith. When a mercury switch 61a–61c and 62a–62c changes its state from a normally opened position to a normally closed position in response to motion of the vehicle, the associated positive going signal forming network 65a–65c and 66a–66c applies a positive going signal over a conductor 68.

Each positive going signal forming network 65a–65c and 66a–66c includes a capacitor, resistor and a diode. For example, the positive going signal forming network 65a includes a capacitor $C_2$, resistors $R_2$ and $R_4$ and rectifier $D_2$. When the mercury switch 61a is closed, the capacitor $C_2$ charges over the following path: conductor 64, capacitor $C_2$, rectifier $D_2$, and resistor $R_5$. This results in a positive signal being applied to line 68. When the mercury switch 61a is open in response to the motion of the vehicle to change its state, the capacitor $C_2$ discharges through the resistors $R_4$ and $R_2$.

A negative going signal from the mercury switch circuit 60 is applied over the conductor 67 and a positive going signal from the mercury switch circuit 60 is applied over the conductor 68. When a negative going signal is applied over the conductor 67, the sensing amplifier 70 produces a positive going signal which is applied over a conductor 69. Thereupon, the sensing amplifier 71 produces a negative going signal, which is conducted over the conductor 72 for changing the state of the alarm flip-flop circuit 35. The diodes of the mercury switch circuit 60, such as diodes $D_1$ and $D_2$, are used to isolate the respective switch circuits from one another to prevent the closed mercury switches from shorting the signal of an opening mercury switch.

A positive going signal from the mercury switch 60 over the conductor 68 is applied to the input of the sensing amplifier 71 over the conductor 69. The sensing amplifier 71 produces a negative going signal, which is conducted over the conductor 72 for changing the state of the alarm flip-flop circuit 35.

When the alarm flip-flop circuit 35 changes its state, the warning lamp 17 is energized in a manner previously described for operating the horn, not shown, through closed contacts 55a and disabling the ignition system, not shown, through the opening of the contacts 55b.

Should an unauthorized person operate the thumbwheel selector switch 15 to a setting for a numerical code other than one of the preselected numerical codes and operate the push button switch 16, then the thumbwheel selector switch 15 will close and a ground connection will be placed on the input side of an amplifier 85a of a wrong number flip-flop circuit 85 (FIGS. 2 and 3B). In so doing, the flip-flop circuit 85 changes its state and a positive potential is applied over a conductor 86 from the output of the amplifier 85a. A capacitor 84 is used to suppress noise. Diode 87 is in the reset circuit for the alarm flip-flop circuit 35. Diode 88 is in the reset circuit for the wrong number flip-flip circuit 85. Diode 89 is in the drive circuit for the amplifier 50A.

Connected to the conductor 86 is the input of the current amplifier 50a of the alarm driver 50. As a consequence thereof, the relay 55 operates in a manner previously described to close contacts 55a to operate a horn, not shown, and to open the contacts 55b to disable the ignition system, not shown.

The apparatus 10 includes a reset cycle for automatically resetting the apparatus 10 to its initial condition after a predetermined time interval, should the apparatus 10 not be turned off. If the apparatus 10 is not turned off, the apparatus 10 will be recycled for a continuous alarm state operation during the succeeding predetermined time interval. For this purpose, a conductor 90 (FIGS. 2 and 3B) is connected to the output of the current amplifier 50a. Connected to the current amplifier 50a over the conductor 90 is a time delay circuit 95. The time delay circuit 95, in the exemplary embodiment, delays the reset pulse for a period of thirty seconds, and comprises resistors 96 and 97 and a capacitor 98. A diode 99 serves to speed up reset time when the turnoff signal is initiated. The time delay circuit 95 is connected to the input side of an amplifier 100 which, in turn, is connected to a time delay circuit 105 (FIGS. 2 and 3B). The time delay circuit 105 comprises resistors 106 and 107 and a rectifier 108 for a time delay of thirty seconds.

Connected to the output of the time delay circuit 105 is an amplifier 110. Thus, when the apparatus 10 is still turned on, the reset network will apply a signal over a conductor 115 to reset the alarm state of the flip-flop circuit 35 to normal after each one-minute interval and apply a signal over the conductor 116 to reset the wrong number state of the flip-flop circuit 85 to normal.

For turning off the apparatus 10, an operator manually operates the thumbwheel selector switch 15 to a preselected numerical code for an "off" state. In so doing, the contacts 15b of the selector switch 15 close. The operator then actuates the push button switch 16 to close the same, placing a ground on the input side of the amplifier 20b of the on-off flip-flop circuit 20. This action produces a positive signal in the output of the amplifier 20b. The positive signal is conducted over the conductor 31 and is applied to the input side of the amplifier 35a of the alarm flip-flop circuit 35. The application of a positive signal to the amplifier 35a of the flip-flop circuit 35 inhibits the change of state of the flip-flop circuit 35 to an alarm state.

It is to be noted that there is a ten-second delay between the operating of an alarm and the opening of a door of the vehicle. Thus, an authorized operator turning "off" the apparatus 10 in ten seconds would prevent the energization of the relay 55 and thereby prevent the operation of any alarm. In a similar manner, the turning "off" of the apparatus 10, as above-described, will effect the deenergization of the relay 55 through the returning of the flip-flop circuit 35 to its initial state to stop the operation of an alarm. Lastly, the turning "off" of the apparatus 10, as above-described, will inhibit the resetting of the flip-flop circuit 35 through the switches 34a, 34b and 34c on the door, trunk and hood of the vehicle.

To supply power to the apparatus 10, a suitable source of D.C. power supplies, in the exemplary embodiment, 12 volts through a suitable power line filter 120 (FIG. 3B). Twelve volts is applied to the relay 55. The direct current voltage is reduced to 8 volts for aplication to the remainder of the circuit by a voltage drop across a Zener diode 122. A Zener diode 121 prevents damage resulting from excessive voltages. It is apparent that a toggle switch, not shown, in the rear of the housing 11 and connected in series with the push button 16 can be actuated to an open position to obviate the inadvertent operation of the alarm when the push button 16 is accidentally actuated and the thumbwheel 15 setting is other than one of the selected codes.

We claim:

1. Apparatus for inhibiting vehicular theft comprising:
   (a) a plurality of switches for sensing motion of a vehicle, each of said switches having an individual initial state dependent on the supporting surface for a vehicle and arranged to change its state from its initial state in response to motion, said switches respectively being either opened or closed in the initial state depending on the supporting surface for the vehicle and said switches individually selectively change from the initial state in response to movement of the vehicle, some of said switches being opened in said initial state and other of said switches being closed in said initial state;
   (b) means operative for inhibiting vehicular theft; and
   (c) circuit means responsive to said switches individually being selectively changed from the initial state in response to movement of the vehicle for operating said means inhibiting vehicle theft.

2. Apparatus as claimed in claim 1 wherein said circuit means comprises:
(a) a negative going pulse forming network for each of said switches for producing a negative going pulse in response to a change of its associated switch from its initial state;
(b) a positive going pulse forming network for each of said switches for producing a positive going pulse in response to a change of its associated switch from its initial state;
(c) a negative pulse sensing amplifier connected to said negative going pulse forming networks to produce a positive pulse for operating said means inhibiting vehicle theft in response to receiving a negative pulse from said negative going pulse forming networks; and
(d) a positive pulse sensing amplifier connected to said positive going pulse forming networks to produce a negative pulse for operating said means inhibiting vehicle theft in response to receiving a positive pulse from said positive going pulse forming networks.

3. Apparatus for inhibiting vehicle theft comprising:
(a) means operative for inhibiting vehicular theft;
(b) circuit means for controlling the operation of said theft-inhibiting means;
(c) means including a selector switch connected to said circuit means to select one code for enabling said circuit means to operate said theft-inhibiting means in response to one predetermined code setting and to select another code for disabling said circuit means to prevent said theft-inhibiting means from operating in response to another predetermined code setting; and
(d) wrong code means connected to said circuit means and responsive to said selector switch being actuated to a setting other than one of said predetermined codes for activating said circuit means to operate said theft-inhibiting means.

4. Apparatus as claimed in claim 3 and comprising means actuated by the opening of a door for activating said circuit means to operate said theft-inhibiting means.

5. Apparatus as claimed in claim 4 and comprising time delay means interposed between said theft-inhibiting means and said circuit means for delaying the operation of said theft-inhibiting means for a predetermined time interval to enable an operator to operate said selector switch for enabling said circuit means and to leave the vehicle in said predetermined time interval without operating said theft-inhibiting means.

6. Apparatus as claimed in claim 4 and comprising time delay means interposed between said theft-inhibiting means and said circuit means for delaying the operation of said theft-inhibiting means for a predetermined time interval to enable an operator to enter the vehicle and to operate said selector switch to disable said circuit means within the predetermined time interval without operating said theft-inhibiting means.

7. Apparatus as claimed in claim 3 and comprising a resetting circuit including time delay means connected to said circuit means to reset said circuit means for continued operation of said circuit means after each predetermined time interval provided by said time delay means until said means including said selector switch disables said circuit means.

8. Apparatus as claimed in claim 3 and comprising a resetting circuit including time delay means connected to said wrong code means to reset said wrong code means for continued operation of said wrong code means after each predetermined time interval provided by said time delay means until said means including said selector switch disables said circuit means.

* * * * *